Feb. 3, 1959     L. D. COBB     2,872,219
DEMOUNTABLE CLOSURE
Filed Dec. 6, 1954
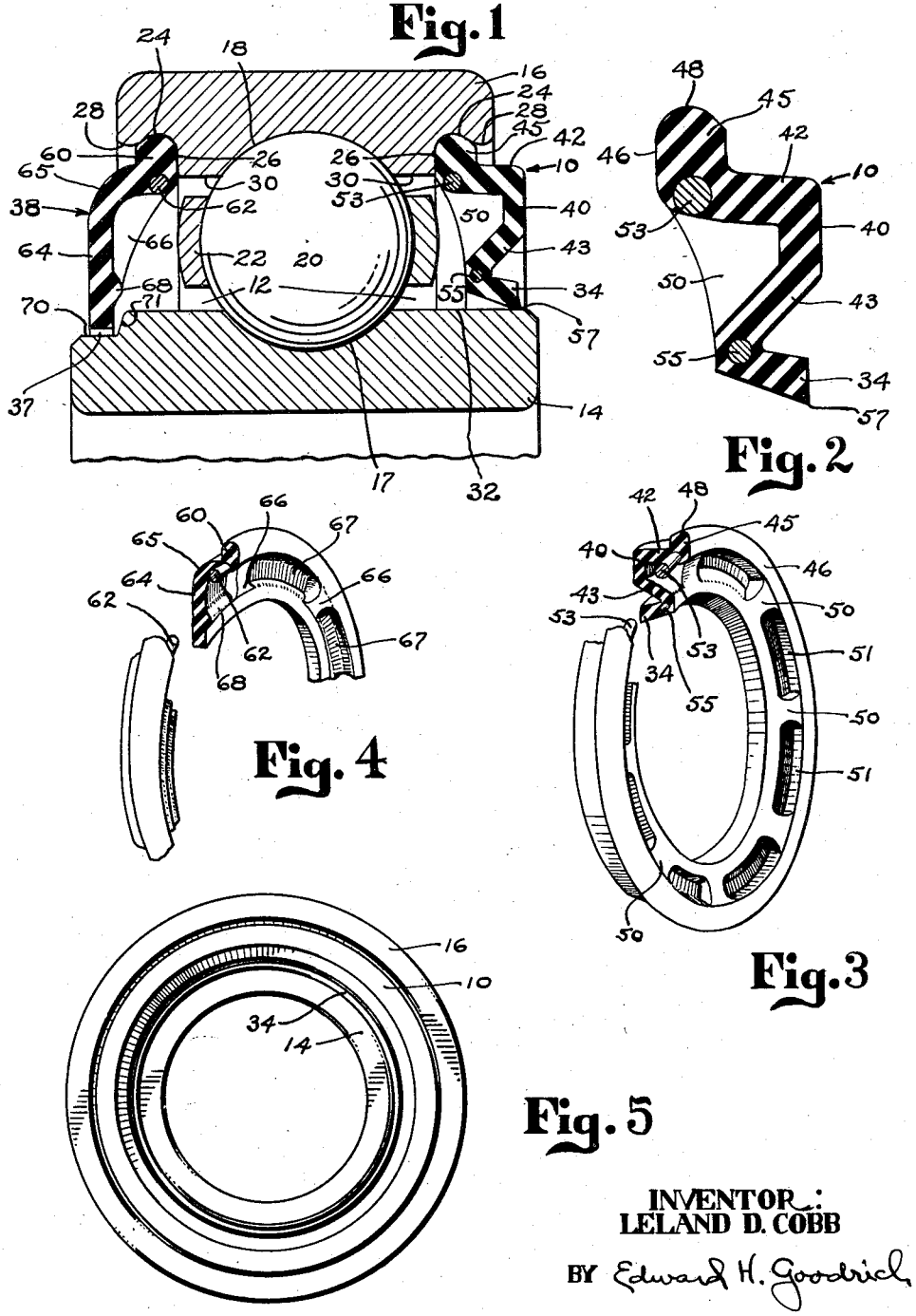
INVENTOR:
LELAND D. COBB
BY Edward H. Goodrich,
HIS ATTORNEY.

United States Patent Office 2,872,219
Patented Feb. 3, 1959

2,872,219

DEMOUNTABLE CLOSURE

Leland D. Cobb, Forestville, Conn., assignor to General Motors Corporation, Detroit, Mich., a corporation of Delaware Application December 6, 1954, Serial No. 473,312

6 Claims. (Cl. 286—5)

This invention relates to a closure for extending across the annular space between a pair of relatively rotatable members and particularly to a demountable closure or seal for retaining lubricant within an antifriction bearing and preventing the entrance of dirt, grit and other objectionable matter into the bearing.

The life and efficiency of a precision antifriction bearing, such as a ball bearing, is largely dependent upon the maintenance of a suitable lubricant within the bearing and upon preventing the ingress of deleterious matter into the bearing. Heretofore, it has been the practice to permanently install seals at the ends of the annular lubricant chamber within which the rolling elements operate in an antifriction bearing. Many of such bearings are subjected to occasional heavy overloads which rapidly overheat the bearing and oxidize the bearing lubricant. This causes the lubricant to harden and provides insufficient lubrication which further heats the bearing all of which results in lubrication failure and a much shortened bearing life. Additionally, these permanently installed seals often leak slightly causing insufficient lubrication and much shortened bearing life. It has not been found practical to remove and replace such a permanently installed seal since the removal of the seal spoils the seal and usually damages the bearing. Hence, the life of such permanently sealed bearings is often shortened over their normally expected life since the oxidized lubricant cannot be practically removed and replaced with fresh lubricant while the bearing remains in its operative assembly in a machine. Consequently, these sealed antifriction bearings are usually given no attention until failure and much production time is lost while a machine is dismantled to replace the failed bearings.

It is, therefore, an object of this invention to provide an improved closure member of simple construction which may be easily removed and replaced from closing relation with the end of a lubricant chamber without injury to the closure member or parts associated therewith to facilitate cleaning out of the lubricant chamber and replenishment of the lubricant.

A further object is to provide for the end of an annular lubricant chamber in an antifriction bearing an improved yieldably deformable closure member of simple and efficient construction which may be repeatedly and easily detached from and reinserted without damage to the closure or to the bearing to facilitate cleaning and relubrication of the bearing while it remains mounted in operative position.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

Figure 1 is a fragmentary cross sectional view of a ball bearing showing two related forms of my demountable closure.

Figure 2 is an enlarged fragmentary cross section of the closure shown at the right hand end of Figure 1.

Figure 3 is a broken away perspective view of the closure at the right hand end of Figure 1.

Figure 4 is a fragmentary perspective view of the closure shown at the left hand end of Figure 1.

Figure 5 is an end elevation of a bearing with my demountable closure in operative position.

My demountable closure at 10 is yieldably deformable and so constructed that it may be repeatedly mounted and removed without damage in closing relation across the end of an annular lubricant chamber 12 between a pair of relatively rotatable members herein illustrated as antifriction bearing inner and outer race rings 14 and 16 having raceways 17 and 18 that receive rolling elements such as balls 20 guided by a separator or cage 22. Each end of one of the race rings, as the outer race ring 16, has an annular seal-receiving groove 24 which is curved transversely between a generally radially disposed annular shoulder 26 and a transversely rounded annular land 28 having a diameter intermediate between that of the bottom of the groove 24 and that of an inner cylindrical wall 30 of the race ring 16. The other race ring, as the inner race ring 14, has a cylindrical surface 32 against which a flexible annular lip 34 of the seal is in lightly deformable sealing contact.

The left hand end of the inner race ring 14 is annularly notched at 37 to receive the inner periphery of a demountable annular closure member 38 to be later described. My closure member or seal may be composed of various inherently resilient rubber-like materials that may be suitably molded to provide a required shape and desired yieldable characteristics and which will not appreciably deteriorate in the presence of heat, light, and bearing lubricants. One such rubber-like material for my closure members 10 and 38 may comprise a resilient vulcanized synthetic rubber embodying a polymerization product of butadiene and acrylic nitrile.

In the closure illustrated at the right hand of Figure 1 and in Figures 2 and 3, my seal 10 is of generally chevron shape in cross section. This seal has a substantially radially disposed annular wall 40 outwardly merging with an axially outwardly extending annular wall or flange 42 and inwardly merging with a frusto-conical wall 43 from which the resiliently yieldable frusto-conical annular lip 34 angularly projects outwardly into lightly wiping sealing engagement with the cylindrical surface 32 of the race ring 14 as shown in Figure 1. The generally chevron-shaped contour formed by the seal walls provide for a freely yieldable radial resiliency of the seal body so that the freely deformable lip 34 will easily and effectively maintain a light sealing contact against the cylindrical wall 32 at all times.

A compressibly resilient annular bead 45 projects radially outwardly from the inner end of the wall 42 and has a flat inner side face 46 and a transversely rounded periphery 48. This bead 45 is preferably slightly larger than the diameter and the width of the groove 24 in which it is deformably and demountably seated. With this arrangement, the bead may be easily snapped past the annular land 28 into and out of sealing engagement against the shoulder 26 and against the walls of the groove 24. Due to the inherent yieldability of this bead, it will effectively seat against the race ring 16 and be firmly held in position without producing objectionable distorting forces as has been the case with some prior types of seals which were tightly expanded into permanently seated position. To add to the rigidity of the seal 10 and yet allow sufficient flexibility thereof in its sealing relation, I have provided a plurality of circumferentially spaced reinforcing ribs 50 molded in situ with the seal and composed of the same resiliently yieldable rubber-like seal material. Between these ribs 50 I have provided a series of circumferentially spaced arcuate pockets 51 which material adds to the capacity of the lubricant chamber 12 thus providing space for additional lubricant for the rolling elements within the bearing.

A reinforcing member, such as a wire ring 53, is embedded in the bead 45 and preferably adjacent to the inner periphery of the bead so that the resilient material of this bead will be compressed about the ring 53 to further aid the sealing engagement of the bead against the outer race ring 16. This ring 53 may be vulcanized in position within the bead while the seal 10 is being molded, or, if desired, a groove may be provided in the bead for this ring during molding and the ring may thereafter be inserted into this groove where it will be resiliently gripped due to the inherent resiliency of the bead. Also, I preferably provide a further reinforcing ring 55 formed within the seal 10 at the juncture of the lip 34 and the frusto-conical wall 43. In some instances, where greater seal flexibility is desired, the ring 55 may be eliminated. Due to the frusto-conical contour of the lip 34, its least diameter terminates in an annular, circular edge 57 which freely and deformably contacts in antifrictional sealingly wiping engagement against the relative rotatable cylindrical inner race ring face 32. The freely yieldable character of this lip provides for an effective sealing engagement of the lip against the race ring 14 even in the event of misalignment of the relatively rotatable race rings 14 and 16.

In the embodiment shown at the left hand end of Figure 1 and in Figure 5, I have provided a demountable annular closure 38 having a generally radially disposed bead 60 arranged to be snapped past the annular land 28 into and out of firmly seated sealing relation within the groove 24 and against shoulder 26 in the same manner as described with reference to the mounting of the seal 10 in the outer race ring. The bead 60 may also be reinforced as by an embedded reinforcing ring 62 whereby the bead will be further compressed into seated relation against the outer race ring. The closure member 38 is provided with a generally radially disposed side wall 64 connected to the bead 60 by an arcuate annular portion 65. Generally radially disposed and circumferentially spaced reinforcing ribs 66 reinforce the side wall 64 against undue lateral deflection but permit sufficient lateral resiliency of these walls. The ribs 66 further provide circumferentially spaced lubricant recess pockets 67 generally corresponding to the pockets 51 to add capacity to the lubricant chamber 12. The wall 64 on its inner side and preferably near its inner periphery is provided with an annularly extending reinforcing bulge 68 which preferably blends with the reinforcing ribs.

An inner periphery of the wall 64 is preferably cylindrical and terminates in closely spaced relation to but out of engagement with a cylindrical wall 70 of the inner race ring notch 37. This notch 37 also has an annular shoulder 71 herein shown as frusto-conical and in spaced relation to the inner face of the side wall 64. With this arrangement, during relative rotation of the inner race ring and the demountable closure member 38, this closure member will remain in very closely spaced relation to this inner race ring within the notch 37 and will normally remain out of contact wtih this inner race ring. However, in the event of misalignment of bearing parts or undue pressures against the outside of the resilient member 38, causing interengagement of the closure member and race ring, this will only result in a light antifrictional sealing contact of the inner edge of the closure member 38 against the frusto-conical wall 71 without incurring damage to the closure member or to the bearing.

I claim:

1. In a demountable closure for positioning across an annular lubricant chamber between a pair of relatively rotatable members one of which has an annular groove opening towards the other member, an inherently resilient annular bead demountably and deformably seated in sealing engagement with the walls of the groove to demountably secure the closure in position, a resiliently flexible annular flanged portion integral with the bead and radially spaced from both of said relatively rotatable members, the flanged portion extending axially outwardly from the bead and thence radially across said lubricant chamber into proximity with said other member, and a plurality of resilient reinforcing ribs bonded to the inside of the annular flanged portion and to said bead.

2. In a demountable closure for positioning across an annular lubricant chamber between a pair of relatively rotatable members one of which has an annular groove opening towards the other member, an inherently resilient annular bead demountably and deformably received in the groove, a reinforcing ring contained completely within the bead, the bead being resiliently compressed between said ring and groove to sealingly and demountably seat within the groove, a resiliently flexible annular flanged portion integral with said bead and extending axially outwardly from the bead in spaced relation to both relatively rotatable members and then generally radially towards said other member, and reinforcing ribs extending from the bead and bonded to said resilient annular flanged portion.

3. In a demountable closure for positioning across an annular lubricant chamber between a pair of relatively rotatable members one of which has an annular groove opening towards the other member, an annular bead resiliently deformable in all directions, said bead being deformably received in sealing relation against the walls of the groove to demountably locate the closure in position, a resilient annular flanged portion bonded to the bead and extending axially outwardly therefrom in radially spaced relation to both relatively rotatable members and then generally radially extending towards said other member, a resilient sealing lip on said radially extending portion in deformable sealing engagement with said other member, and a plurality of resilient reinforcing ribs extending from the bead to said sealing lip to laterally stiffen the closure member and provide circumferentially spaced arcuate lubricant pockets therein.

4. In a demountable closure for positioning across an annular lubricant chamber between a pair of relatively rotatable members one of which has an annular groove opening towards the other member, an inherently resilient annular bead demountably and deformably received in the groove and seated therein to demountably locate the closure in position, a reinforcing ring completely embedded within and secured to the bead, a resilient annular flanged portion of the closure extending axially outwardly from the bead and then generally radially of the lubricant chamber towards said other member, a resilient lip integral with the radially extending portion and projecting angularly therefrom into sealing engagement with said other member, and a second reinforcing ring embedded in the closure at the juncture of said lip with the radially extending portion of the closure.

5. In a demountable closure for positioning across an annular lubricant chamber between a pair of relatively rotatable members one of which has an annular groove opening towards the other member, a compressibly resilient annular bead deformably seated in sealing engagement with the walls of the groove and demountably holding the closure in position across said chamber, a reinforcing ring embedded within said bead, a resilient annular portion integral with and axially projecting outwardly from the bead, a resilient annular radial wall integral with the annular portion, a frusto conical resilient wall extending generally inwardly from said radial wall, an inherently resilient frusto-conical sealing lip bonded to the frusto-conical wall and directed angularly outwardly from said frusto-conical wall into deformable sealing engagement with said other member, and a second reinforcing member embedded in the closure at the juncture of said lip with said frusto-conical wall.

6. In a demountable closure for positioning across an annular lubricant chamber between a pair of relatively rotatable members one of which has an annular groove opening towards the other member, a compressibly resilient annular bead deformably seated in sealing engagement with walls of the groove and demountably holding the closure in position across said chamber, a resilient annular flange integral with and axially projecting outwardly from the bead, a reinforcing ring embedded within the bead at its juncture with said flange, a resilient annular wall extending from the annular flange towards said other member, a resilient frusto conical wall extending from said wall towards said other member, an annularly disposed resilient sealing lip bonded to the frusto conical wall and sealingly engageable with said other member, a second reinforcing ring in said closure at the juncture of said lip with the frusto-conical wall and a plurality of circumferentially spaced reinforcing ribs bonded to the bead and to the flange and to both of said walls.

References Cited in the file of this patent

UNITED STATES PATENTS

| | | |
|---|---|---|
| 2,071,736 | Farmer | Feb. 23, 1937 |
| 2,275,325 | Searles | Mar. 3, 1942 |
| 2,467,049 | Peterson | Apr. 12, 1949 |
| 2,723,869 | Cobb | Nov. 15, 1955 |
| 2,731,284 | Chambers et al. | Jan. 17, 1956 |
| 2,755,113 | Baumheckel | July 17, 1956 |

FOREIGN PATENTS

| | | |
|---|---|---|
| 110,836 | Sweden | June 6, 1944 |
| 495,066 | Canada | Aug. 4, 1953 |
| 669,881 | Great Britain | Apr. 9, 1952 |